United States Patent [19]
Kershaw

[11] Patent Number: 6,154,591
[45] Date of Patent: Nov. 28, 2000

[54] TUNABLE OPTICAL DEVICE

[75] Inventor: Stephen V. Kershaw, Ipswich, United Kingdom

[73] Assignee: British Telecommunications public limited company, London, United Kingdom

[21] Appl. No.: 09/062,668

[22] Filed: Apr. 20, 1998

[51] Int. Cl.[7] .................................................. G02B 6/26
[52] U.S. Cl. ................................ 385/39; 349/1; 349/198
[58] Field of Search .................................. 385/31–52, 65, 385/83; 349/198, 1, 200

[56] References Cited

U.S. PATENT DOCUMENTS

| | | | |
|---|---|---|---|
| 3,975,082 | 8/1976 | Winzer ................................... | 350/96 C |
| 4,142,776 | 3/1979 | Cherin et al. ......................... | 350/96.21 |
| 4,146,299 | 3/1979 | Wellington et al. .................. | 350/96.21 |
| 4,790,634 | 12/1988 | Miller et al. .......................... | 349/198 |
| 4,923,269 | 5/1990 | Healey ................................... | 350/96.15 |
| 5,015,057 | 5/1991 | Rumbaugh et al. .................. | 350/96.15 |
| 5,111,321 | 5/1992 | Patel ...................................... | 349/1 |
| 5,532,854 | 7/1996 | Fergason ............................... | 359/93 |
| 5,781,268 | 7/1998 | Liu et al. ............................... | 349/198 |

FOREIGN PATENT DOCUMENTS

| | | |
|---|---|---|
| 63-5327 | 1/1988 | Japan . |
| WO 92/06394 | 4/1992 | WIPO . |

OTHER PUBLICATIONS

Patent Abstracts of Japan, vol. 012, No. 203 (P–715), Jun. 11, 1988 & JP 63 005327A (Idemitsu Kosan Co. Ltd.) Jan. 11, 1988.

Yufei et al, "High–Speed Liquid Crystal Fiber Fabry–Perot Tunable Filter", IEEE Photonics Technology Letters, Sep. 1996, IEEE, USA, vol. 8, No. 9, ISSN 1041–1135, pp. 1190–1192.

Patel, "Electro–optic Switch Using a Liquid Crystal Fabry–Perot Filter", SPIE, vol. 1665, pp. 244–249 (1992) no month.

Sneh et al, "High–speed Wavelength Tunable Liquid Crystal Filter", IEEE Photonics Technology Letters, vol. 7, No. 4, Apr. 1995, pp. 379–381.

Madou et al, "Integrated Circuit Manufacturing Techniques Applied to Microfabrication", Handbook of Chemical and Biological Sensors, 1996, IOP Publishing, Bristol and Philadelphia no month.

MacLeod et al, "Thin Film Optical Filters", Adam Hilger Ltd., Bristol, 1986 no month.

Kashyap, "Photosensitive Optical Fibers: Devices and Applications", Optical Fiber Technology 1, pp. 17–34 (1994) no month.

Maze, "Determination of Nematic Liquid Crystal Elastic and Dielectric Properties from the Shape of a Capacitance–Voltage Curve", Mol. Cryst. Liq. Cryst., 1978, vol. 48, pp. 273–287 no month.

(List continued on next page.)

*Primary Examiner*—Rodney Bovernick
*Assistant Examiner*—Ellen E. Kim
*Attorney, Agent, or Firm*—Nixon & Vanderhye P.C.

[57] ABSTRACT

A tunable optical filter comprises optical waveguides separated by a space filled with liquid crystal material which is oriented by an alignment layer or grating to form a Fabry Perot resonant cavity, where the resonant condition is set up by a reflective coating or grating in the optical waveguide, and the refractive index of the liquid crystal may be altered by the application of a voltage across the cavity by means of electrodes. The filter or an array of filters may be constructed using optical fibers between a substrate and a superstrate, preferably with the fibres being located by means of grooves formed in the substrate and superstrate, with individual electrodes in the space between aligned fibres enabling independent tuning of each filter, typically for use in wavelength division multiplexing communication systems. The liquid crystal molecules may be aligned parallel or perpendicular to the length of the fibres. In the perpendicular orientation, without a resonant cavity, the device can be used for polarisation state controller applications.

47 Claims, 10 Drawing Sheets

OTHER PUBLICATIONS

Shaver, "Alignment of Liquid Crystals by Surface Gratings", Technical Report, 538, Lincoln Laboratory, MIT, Oct. 31, 1979.

Schadt et al, "Optical Patterning of Multi–Domain Liquid–Crystal Displays with Wide Viewing Angles", Nature, vol. 381, May 16, 1996, pp. 212–215.

McCormick et al, "Microengineering Design and Manufacture Using the LIGA Process", Engineering Science and Education Journal, Dec. 1994, pp. 255–262.

Kitamura, "Computer Simulation of Director Profile in Two Dimensional Electric Field", SID PROC. 1994 International Workshop on Active Matrix LCDs, pp. 350–343 (1994).

Davies, "Finite–Element Modelling in 2–D of Nematic Liquid Crystal Structures", Electronics Letters, $14^{th}$ Mar. 1996, vol. 32, pp. 582–583.

Welford et al, "Analysis of Electric Field Induced Deformations in a Nematic Liquid Crystal for any Applied Field", Mol. Cryst. Liq. Cryst., 1987, vol. 147, pp. 25–42 no month.

Jacobs, Chapter 2.5, "Liquid Crystals for Laser Applications", in Handbook of Laser Science and Technology, vol. IV, "Optical Materials (Pt. 2)", Ed. M.J. Weber, CRC Press Inc. Boca Raton, Florida, USA (1986) no month.

DRIVE VOLTAGE IN UNITS OF THRESHOLD VOLTAGE $V_0$, $V_0$ = 0.9V

TUNABLE OPTICAL DEVICE

FIELD OF THE INVENTION

This invention relates to a tunable optical device, which has particular but not exclusive application in wavelength division multiplexing (WDM) communication systems.

BACKGROUND

WDM systems involve a number of channels of different wavelength being transmitted simultaneously in an optical fibre, each channel typically being defined by a laser, or high brightness infra-red light emitting diode (IR LED) source. This technique permits the transmission capability of the optical fibre to be upgraded to the multi-Gbit/s range. Tunable optical devices such as tunable optical filters are used in such systems to select a particular wavelength from a range of input wavelengths, with the ability to alter the wavelength to be selected by applying an electrical signal to the filter.

Tunable optical filters are well known. Reference is directed to J S Patel: "Electro-optic Switch Using a Liquid Crystal Fabry-Perot Filter", Proceedings of the SPIE, Vol. 1665, pp. 244–249 (1992). Present methods of making these include a Fabry-Perot resonant cavity containing a discrete liquid crystal cell (discrete cell LCFP), in which a thin layer of liquid crystal material is confined between glass plates with broad band reflective coatings. Reference is directed to A. Sneh, K. M. Johnson, J. Y. Liu: "High-Speed Wavelength Tunable Liquid Crystal Filter", IEEE Phot. Tech. Letters, Vol. 7 No. 4, April 1995, pp. 379–381.

Japanese Laid-Open Patent Publication [1988] 63-5327, "Fabry-Perot Resonator", dispenses with the need for a discrete liquid crystal filled cell and discloses a cell enclosing opposing optical fibres, with the space between and around the ends of the fibres being filled with a liquid crystal material. Electrodes are attached to electrically conductive mirror coatings on the ends of the fibres.

SUMMARY OF THE INVENTION

According to the present invention, there is provided a tunable optical device comprising a substrate and a superstrate, first and second optical waveguides sandwiched between said substrate and said superstrate so as to define a space between said waveguides, an optical resonant cavity extending across said space, said space containing a liquid crystal material to permit tuning of the cavity, and alignment means to orientate the liquid crystal material so that it responds to an applied electric field, wherein the alignment means is disposed on at least one of the substrate and the superstrate.

According to the present invention there is further provided a tunable optical device comprising a housing, first and second optical waveguides extending into the housing so as to define a space between said waveguides, said space defining an optical path between the waveguides, an optical resonant cavity extending across said space, said space containing a liquid crystal material to permit tuning of the cavity, and alignment means to orientate the liquid crystal material so that it responds to an applied electric field, wherein the alignment means are disposed outside the optical path.

Embodiments of this invention can provide several advantages over devices disclosed in the prior art. First, dispensing with the discrete cell construction, and therefore elements such as the beam collimating optical components, permits the fabrication of a large number of devices and arrays of devices on a single wafer, which are more compact and so more readily packaged and integrated than their discrete cell counterparts. This provides a route to low cost wavelength tunable filters.

Second, the device according to the invention may avoid the variations in cell thickness and the poor cavity uniformity which limits cavity finesse in low cost discrete cell LCFPs, and so is capable of improved performance for equivalent cost.

Third, the electrodes and the liquid crystal alignment layers needed to align the liquid crystal molecules so that they respond to an applied electric field, can be removed from the optical path, which can simplify the optical design and improve the propagation of optical radiation through the device, Further, propagation can occur parallel to the liquid crystal alignment surfaces, in which case the cavity length need not be limited by liquid crystal alignment constraints.

A further advantage is that the construction of individually addressable filter arrays on a single substrate layer is facilitated, so enabling very compact devices to be fabricated. Preferably, a device according to the invention includes an individually tunable filter array, in which a plurality of grooves is etched in a substrate and a superstrate, with individual electrodes formed on the superstrate or substrate between the grooves, and terminating in the space between the optical fibres located in the grooves, which space is filled with liquid crystal material, which has a selectively variable refractive index for one or more polarisation states of the incident light. A voltage may be applied to each electrode individually to enable independent tuning of each filter in the array.

The formation of an optical resonant cavity may be achieved in a number of ways. One way is to provide a partially reflective coating on the end of one or both of the optical fibres. Alternatively, or in addition, at least one of the optical fibres may include a Bragg grating, which enables cavity length to be set by appropriate positioning of the grating(s) along the fibre. The refractive index modulation depth of the grating may also influence the effective cavity length.

V grooves may be formed in the substrate for locating and holding the optical fibres in position, which permit alignment of the fibres. The substrate is preferably formed from silicon, or from another crystal material which permits the etching of suitable V grooves.

Alternatively, essentially rectangular grooves to hold and locate the optical fibres are formed in the substrate, preferably a polymer such as a polymethacrylate, for example PMMA, by a process which permits accurate fabrication of such grooves, an example of which is known as the LIGA process. Reference is directed to "Integrated circuit manufacturing techniques applied to microfabrication", M. Madou, H. Lynn Kein, Chapter 3 in "Handbook of Chemical and Biological Sensors", Editors R. F. Taylor and J. S. Schultz, IOP Publishing, Bristol and Philadephia, 1996.

As an alternative to the use of standard optical fibres, tapered core fibres may be used in which the core diameter increases towards the output (i.e. towards the cavity). This may reduce cavity loses, particularly where the fibre-to-fibre separation is large, for example, in excess of 20 $\mu$m.

According to a further aspect of the invention, there is provided a tunable optical device comprising a substrate and a superstrate, first and second elongate optical fibres sandwiched between said substrate and said superstrate so as to define a space between said fibres, said space containing a liquid crystal material having an optical fast axis, and alignment means to orientate the liquid crystal material so that it responds to an applied electric field, wherein the alignment means are arranged to orientate the liquid crystal material in a direction transverse to the length of said fibres, whereby to permit rotation of said fast axis of said liquid crystal material.

A plurality of such tunable devices may be cascaded to form a polarisation state controller.

According to the invention, there is further provided a polarisation insensitive tunable optical device comprising a substrate and a superstrate, first and second optical fibres sandwiched between said substrate and said superstrate so as to define a space between said fibres, an optical resonant cavity extending across said space, said space containing a liquid crystal material to permit tuning of the cavity, and an alignment layer to orientate the liquid crystal material so that it responds to an applied electric field, wherein the alignment layer is disposed on at least one of the substrate and the superstrate, said alignment layer comprising first and second parts which orientate the liquid crystal material in a direction generally parallel to the length of the fibres and a third part, between said first and second parts, which orientates the liquid crystal material in a direction transverse to the length of the fibres.

BRIEF DESCRIPTION OF THE DRAWINGS

So that the invention may be more fully understood, embodiments thereof will now be described by way of example with reference to the accompanying drawings, in which.

DETAILED DESCRIPTION

Figure 1:
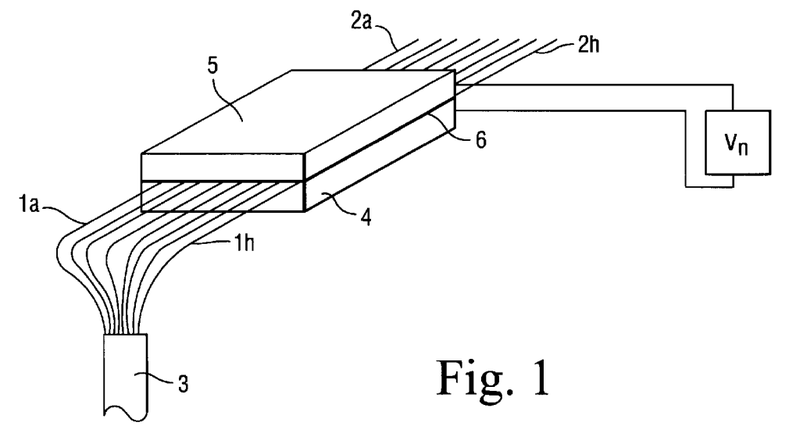
FIG. 1 is a perspective schematic view of a device in accordance with the first embodiment of the invention, shown in the main external features.

Referring to the perspective view in FIG. 1, a device according to the invention consists of an array of eight optical fibres 1a–h from an optical ribbon cable 3 held in an assembly comprising a silicon substrate 4 and superstrate 5, with a further eight optical fibres 2a–h leading out of the assembly. The optical fibres are standard single-mode fibres used, for example, in the 900, 1300 and 1550 nm telecommunications windows, with a typical external cladding diameter of 125 $\mu$m and a typical core diameter of 9 $\mu$m, from which the primary coating, typically a urethane or silicone polymer layer, has been stripped. The assembly is typically 1 cm long and 2 mm wide and is sealed by a standard adhesive such as a UV curable epoxy glue 6 around the edge of the assembly. LUXTRAK LCR 050+UV adhesive manufactured by Ablestik Corporation, USA, has been found suitable. This is cured by application of UV radiation from a standard UV gun/lamp.

Figure 2:
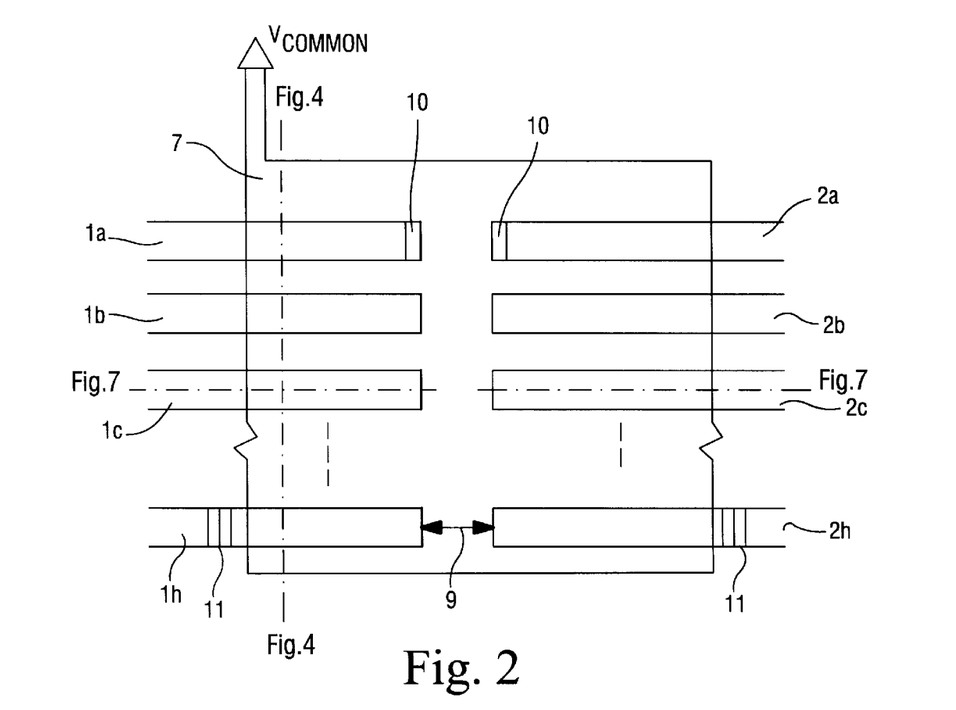
FIG. 2 is a schematic plan view of the substrate of the device shown in FIG. 1 illustrating the layout of optical fibres.
Figure 4:
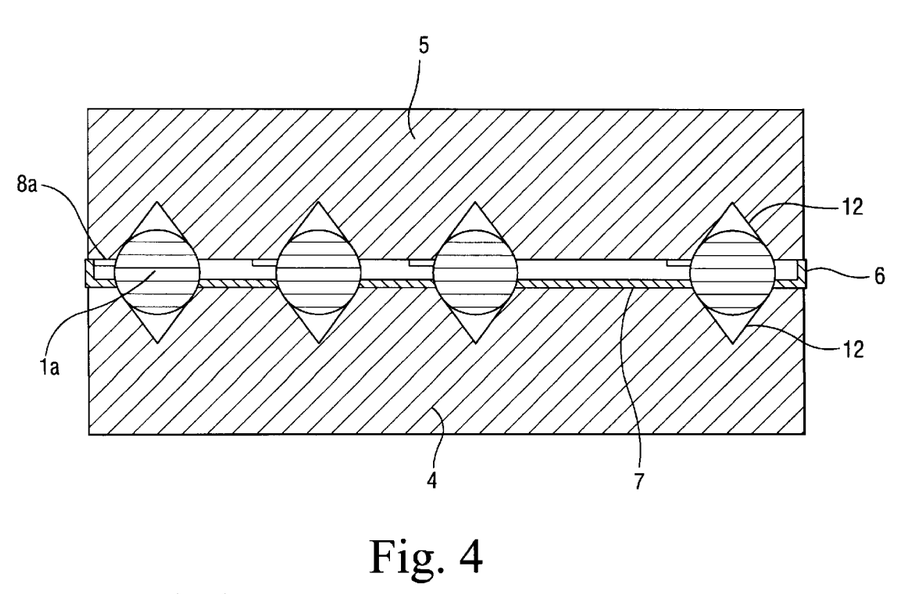
FIG. 4 is a schematic cross-sectional view of a device in FIG. 1 taken across the fibres, as shown by the line FIG. 4—FIG. 4 in FIGS. 2 and 3.

Referring to FIG. 2, an electrically conductive metallisation layer 7, for example, 100 nm thick, is formed on the inner surface of the substrate as shown in FIGS. 2 and 4, by a standard deposition technique such as vapour deposition, typically of a titanium layer to assist adhesion, followed by a gold layer. The substrate 4 comprises undoped, low conductivity silicon, to prevent cross-talk between individual filters on the same substrate. The fibres are located and aligned by means of V grooves which will be described in detail below. Each incoming fibre 1a–h is aligned with a corresponding outgoing fibre 2a–h with a space 9 of typically between 10 $\mu$m and 50 $\mu$m separating the cleaved ends of the fibres.

In an alternative embodiment, particularly suitable for single filter devices or where cross-talk is otherwise not relevant, the metallisation layer may be formed on the outer surface of the substrate. In that case, the silicon substrate is doped to make it conductive, to a resistivity of a few ohm.cm.

As another example, each of the silicon substrate and superstrate are formed from conducting (for example, 3 ohm.cm) n-type (100) silicon wafers, both the inner and outer faces of which are coated with a thin, for example, 100 nm flash of Ti/Au, so that electrodes can be connected to the outside of the substrate and the superstrate.

One embodiments of the optical resonant cavity includes the application of a standard multi-layer dielectric semi-reflective coating 10 on the cleaved ends of the optical fibres, typically consisting of five alternate thin film layers of titania and silica deposited directly onto the fibre facet, typically using a deposition technique generically known as ion assisted deposition, using ions such as oxygen ions. The thickness of each layer is designed to be precisely equal to a quarter wave optical thickness at the wavelength of interest, for example, 1550 nm. Reference is directed to "Thin Film Optical Filters", H. A. MacLeod, Adam Hilger (1986) for a general description of the design and manufacture of mirror coatings.

Another embodiment of the cavity includes a Bragg grating 11 in the optical fibre. The length of the cavity is determined by the position of the grating, which is typically located 300 μm from the end of the fibre. Reference is directed to R. Kashyap: "Photosensitive Optical Fibres: Devices and Applications", Optical Fibre Technology 1, 17–34 (1994), for a description of the formation of a refractive index grating.

Figure 3:
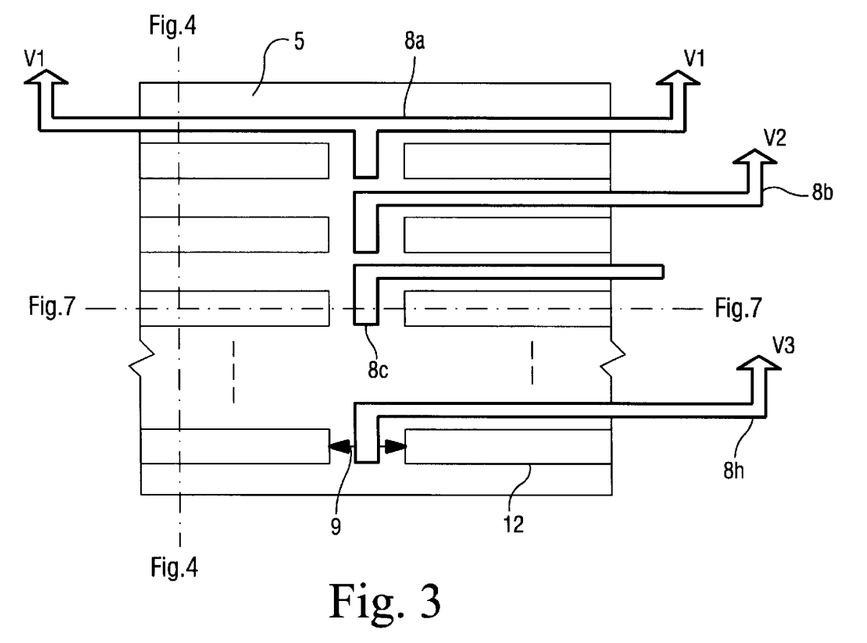
FIG. 3 is a schematic plan view of the superstrate of the device shown in FIG. 1 illustrating the layout of independent electrodes.

Referring to FIG. 3, electrodes 8a–h are formed by vapour deposition of titanium and gold on the superstrate between the grooves in which the fibres will be located, terminating in the unetched portion of the superstrate which forms the space 9 between the ends of the fibres. The electrodes are typically 0.5 cm long and 100 μm wide, but may be brought through the entire structure to enable tapping from each side of the device, both to increase redundancy and to enable the electrode resistance to be halved. This is shown for electrode 8a in FIG. 3. Each of electrodes 8a–h may be connected to an independent voltage source, $V_n$, where n=1 to 8.

Referring to FIG. 4, the optical fibres are located by means of V grooves 12 etched in the surface of the substrate 4 and substrate 5. When the substrate and superstrate are bonded together, the grooves are aligned to form a means of holding each optical fibre in position. The V grooves are etched with a pitch of 250 μm, and the etching process takes advantage of the crystal planes of the silicon. For example, etching the (110) plane of a silicon wafer will form grooves with surfaces lying in the (111) plane.

Figure 5:
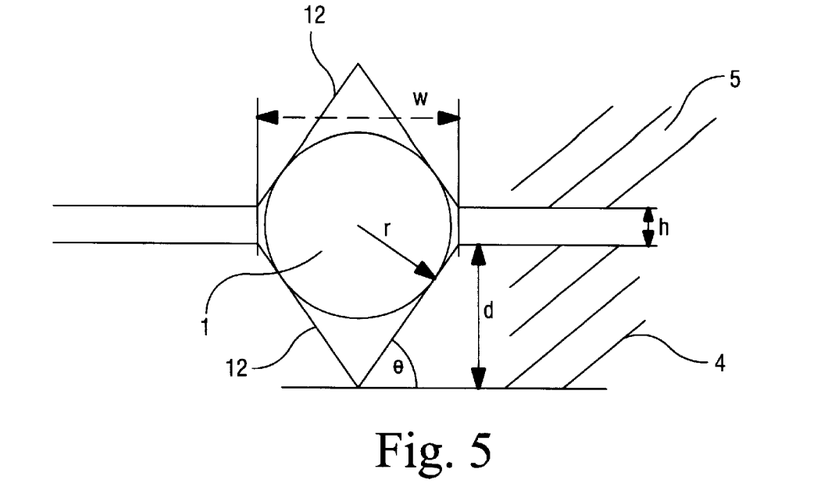
FIG. 5 is a schematic view of a fibre held between two grooves, indicating the cell height and groove angle, width and depth.

Referring to FIG. 5, for a fixed fibre raidius r and groove angle θ, the groove depth d is a function of the desired cell height h, defined as the separation between the substrate 4 and the superstrate 5:

$$d = \frac{r}{\sin(90-\theta)} - \frac{h}{2}$$

The limits on the cell height h are determined by the balance between ensuring that the beam of light in the space 9 between the fibres does not graze the silicon substrate or superstrate, by making the cell sufficiently thick, and producing a cell that is sufficiently fast for a particular application, which requires the cell to be thin. A further factor is the ease with which the liquid crystal material may be confined within the cell. Typically, the cell height h is between 10 μm and 40 μm.

To obtain a groove depth d, a final groove width of w is required (taking account of undercut), where:

$$\frac{w}{2} = \frac{d}{\tan\theta} = \frac{1}{\tan\theta}\left(\frac{r}{\sin(90-\theta)} - \frac{h}{2}\right)$$

For silicon V grooves, θ=54.74°

Assuming a typical desired cell height h=40 μm, and fibre diameter of 125 μm (r=62.5 μm), then the groove depth d is 88.3 μm and the groove width after etching is 126.8 μm.

Each groove is etched along the whole length of the substrate and superstrate except for a length of 10–50 μm in the central region by which the fibres will be separated. The grooves may be formed by standard photolithography, aligning the mask to a set of crystal alignment marks etched beforehand onto wafers. As an alternative, they may be formed by a standard electron beam lithography process: reference is directed to our PCT Publication Number WO 92/06394 entitled "Self-aligned V grooves and Waveguides" for examples of such a process.

Figure 6:
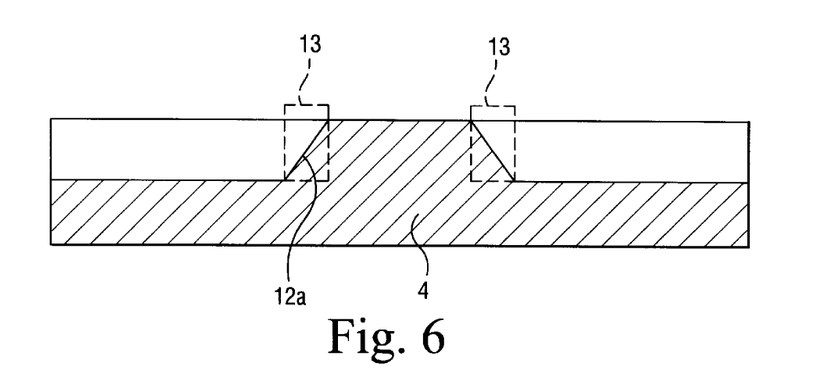
FIG. 6 is a schematic sectional view along a groove, showing the shape of the groove end wall in the substrate only, prior to selective etching.

One difficulty associated with the etching of the V grooves is that this creates an angled end wall 12a shown in FIG. 6, as well as an angled side wall, which may prevent accurate and close alignment of the optical fibres. This difficulty may be overcome by selective etching of the end of the groove using a standard lithography technique. Selective etching of the dotted areas 13 is desirable to create a square profile. The end wall 12a may also be removed by means of a shallow saw cut across the ends of the grooves in the substrate and superstrate. Individually addressable electrodes can still be provided by means of fine bond wires across the resulting gaps.

Figure 7:
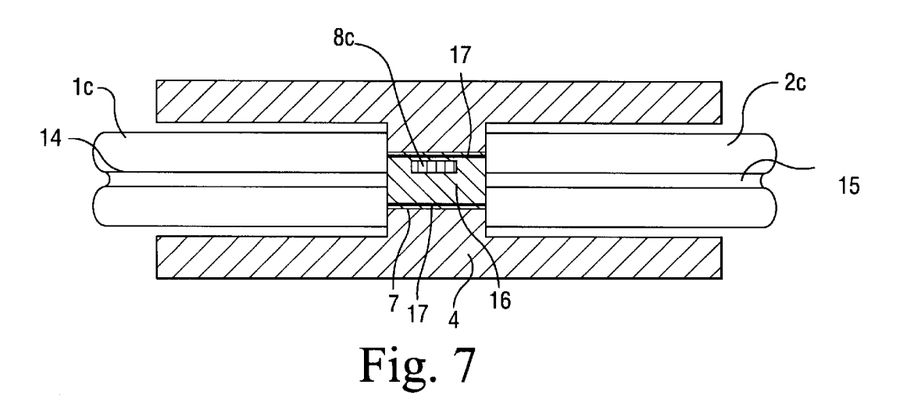
FIG. 7 is a schematic sectional view of the device in FIG. 1 taken along the fibres, as shown by the line FIG. 7—FIG. 7 in FIGS. 2 and 3.

Referring to FIG. 7, the optical fibres are located in each groove so that there is a clear path for optical radiation to pass through core 14 of fibre 1c, typically 9 μm in diameter, to the core 15 of the fibre 2c aligned with it.

The volume between the optical fibres, bounded by the superstrate and substrate, is filled with nematic liquid crystal material 16, which has a selectively variable refractive index. To enable the liquid crystal material to respond to an applied electric field, the liquid crystal molecules must initially be aligned in relation to the substrate 4 and superstrate 5. Therefore, as a final layer, the substrate and superstrate are coated with an alignment layer 17 to a depth of typically 50 nm by the standard technique of vapour deposition of non-stoichiometric silicon oxide, $SiO_x$, at an oblique angle of incidence, to preferentially align the director of the liquid crystal layer uniaxially and in the plane of the substrate and superstrate. Other refractory coatings can also be used. Reference is directed to C. Maze, "Determination of Nematic Liquid Crystal Elastic and Dielectric Properties from the Shape of a Capacitance-Voltage Curve", Mol. Cryst. Liq. Cryst., 46, 273 (1978).

Figure 8A:
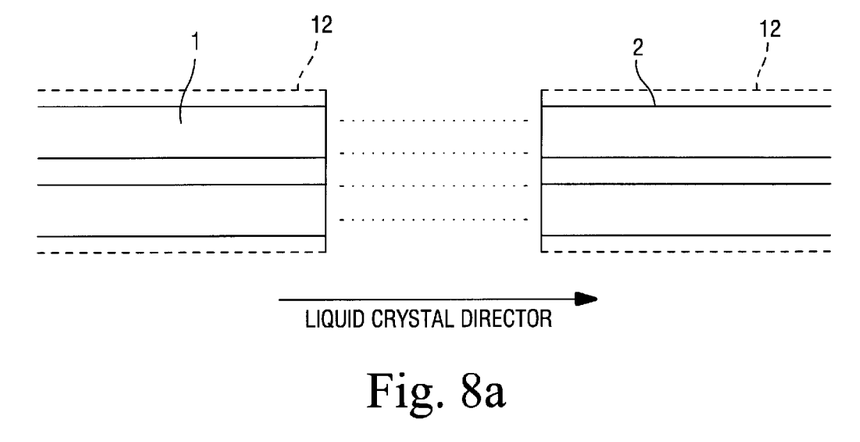
FIG. 8a illustrates the alignment of liquid crystal molecules in a device of a first type I.
Figure 8B:
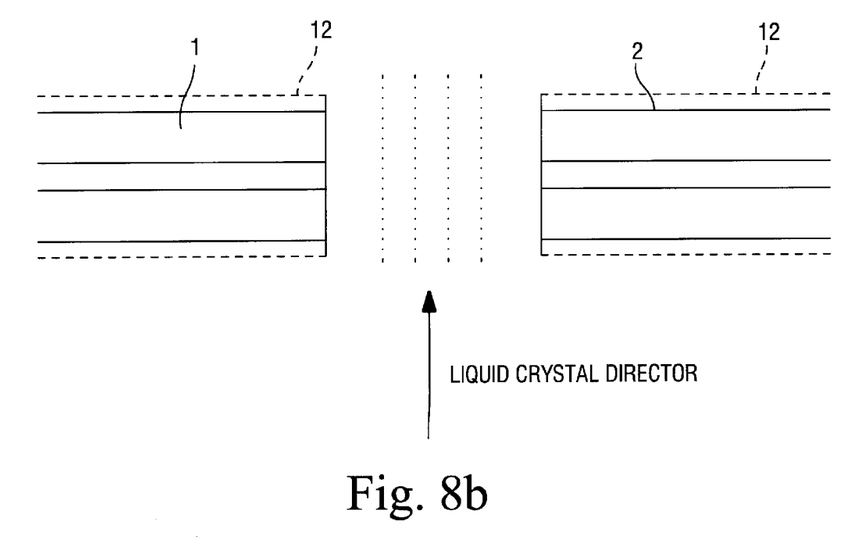
FIG. 8b illustrates the alignment of liquid crystal molecules in a device of a second type II.

Referring to FIGS. 8a and 8b, two orthogonal alignments are possible: one with the alignment direction parallel to the longitudinal axes of the aligned optical fibres, referred to herein as type I, and shown in FIG. 8a, and one with the alignment in the plane of the surface but normal to the fibre axes, referred to herein as type II, and shown in FIG. 8b. FIG. 8a and 8b show the liquid crystal director, which indicates the alignment direction of the liquid crystal molecules.

The substrate and superstrate are flipped after coating so that any pretilt of the liquid crystal molecules, which is typically less than 10° with the described alignment technique, is in the same sense throughout the device, a so-called anti-parallel cell alignment. This reduces alignment defects during switching by favouring only one of several possible distortion modes.

Alignment of liquid crystals can also be achieved by the use of surface gratings, a technique which is well known. Reference is directed to D. C. Shaver: "Alignment of Liquid Crystals by Surface Gratings", Technical Report 538, Lincoln Laboratory, MIT, Oct. 31, 1979.

An alternative alignment technique involves the use of a linear photopolymerisation technology based on polyvinyl methoxycinnamate photopolymers, a technique described in "Optical Patterning of multi-domain liquid crystal displays with wide viewing angles", Martin Schadt, Hubert Seiberle and Andreas Schuster, Nature, Vol. 381, pp. 212–215, (1996).

Alignment of liquid crystals by the above technique becomes increasingly difficult as the thickness of the liquid crystal layer increases. For example, for liquid crystal layers beyond about 80 μm thick, defects begin to appear which scatter light strongly.

Prior to filling with liquid crystal material 16, the device is assembled and sealed with standard UV curing epoxy glue 6, as described above. A gap is left at one corner to allow access to the volume inside. The volume is then filled by dipping the device into a boat filled with the liquid crystal material in a vacuum. The liquid crystals will be drawn in by capillary action and the inlet hole may be sealed by further application of epoxy glue. For a range of substrate/superstrate separations between 10 and 40 μm, the liquid crystal material 16 tends to remain within the assembly even without the application of glue, as a result of capillary action. Many types of nematic liquid crystal materials and mixtures are suitable for this application. However, a nematic liquid crystal material known as E7 manufactured by E. Merck, Darmstadt, Germany, has been found particularly suitable as it is a simple, inexpensive and easily obtained material.

Figure 9:
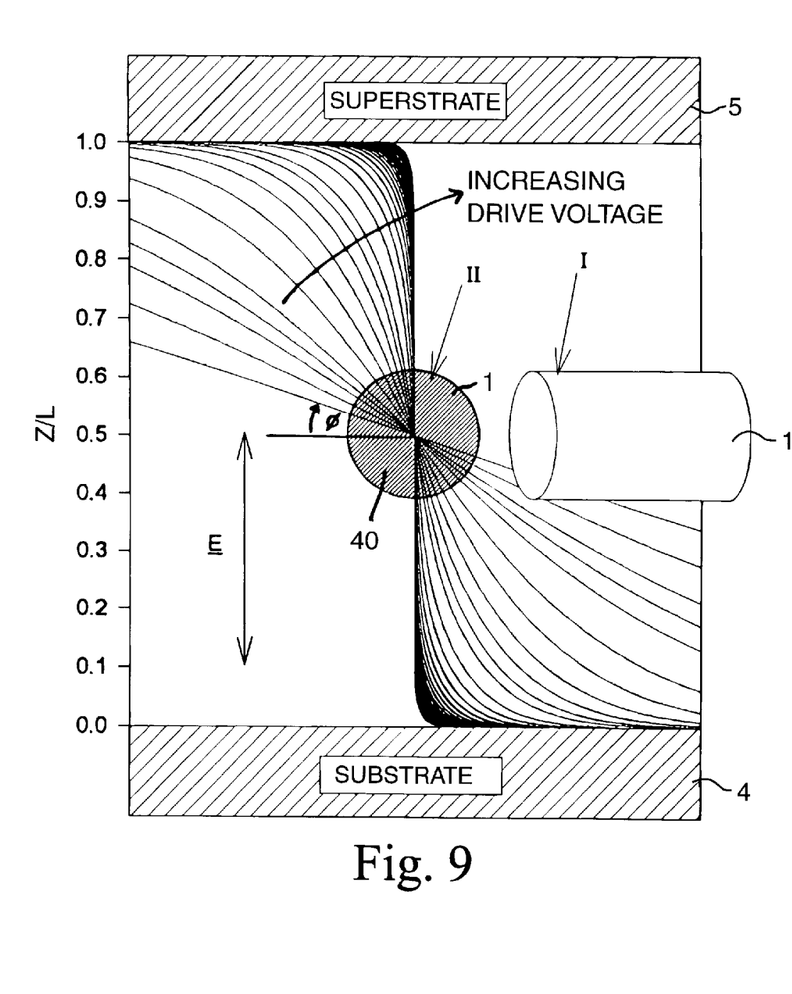
FIG. 9 is a schematic drawing illustrating the effect of an applied voltage on the liquid crystal molecules in both a type I and a type II device.

FIG. 9 illustrates the distribution of the nematic liquid crystal director curves as a function of the normalised vertical position z/L for a range of drive voltages in an ideal device of thickness L, calculated using a simplified model known as Welford and Samble's model, which is explained below. The horizontal axis as viewed in FIG. 9 is scaled identically to the vertical axis, so that the tangents of the director curves represent the true inclinations of the liquid crystal molecules at a given point in the vertical direction.

In the ideal case, below a threshold voltage $V_o$, all the liquid crystal molecules would lie parallel to the substrate and superstrate. As the drive voltage is progressively increased, the liquid crystal molecules rotate clockwise, with those in the centre of the device furthest from the alignment layers rotating through a greater angle than those at the surfaces, which are more firmly anchored by the alignment layers. At a drive voltage of around three times the theoretical threshold voltage $V_o$, the molecules in the centre of the device are virtually perpendicular, whilst those at the inner walls of the device continue to rotate as the drive voltage increases further.

FIG. 9 also shows the relative fibre core proportions and relative location for type I and type II devices for a centrally located 9 μm core diameter fibre in a cell with a 40 μm spacing between substrate and superstrate.

Figure 10:
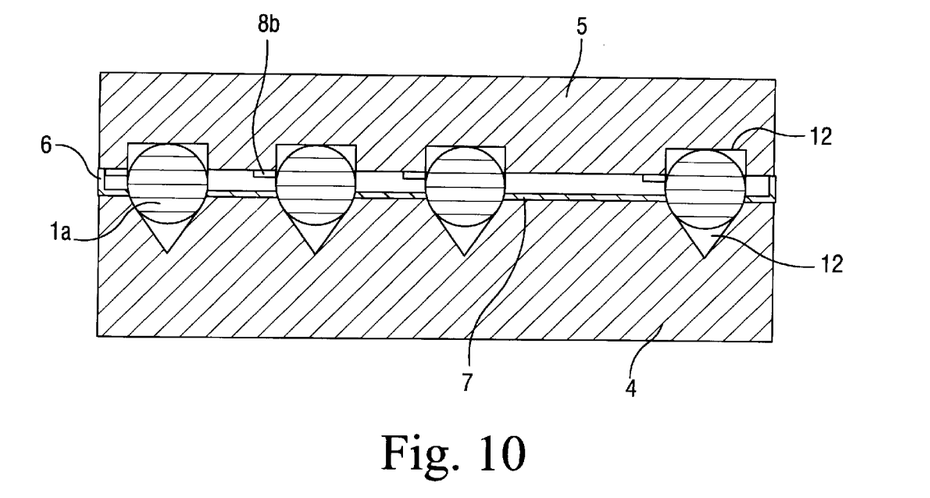
FIG. 10 is a schematic sectional view of a device in accordance with a second embodiment of the invention.

Referring to FIG. 10, in a second embodiment of the invention, the superstrate 5 is formed from a photosensitive glass, such as Hoya PEG3, manufactured by Hoya Corporation, Tokyo, Japan. The glass is exposed to ultraviolet rays through a mask patterned with the groove arrangement, leaving a space between the grooves of 10–50 μm in the central region, as described in the first embodiment. The exposed part of the glass is crystallised by heat treatment, enabling the crystallised part to be dissolved in hydrofluoric acid to produce the grooves. Exposure of the unexposed part to ultraviolet radiation followed by crystallisation by heat treatment produces a stable non-light sensitive superstrate.

The function of the superstrate is primarily to maintain the optical fibres in position within the V grooves on the substrate and to confine the liquid crystal material. The groove depth is controlled to produce the required cell height, while the groove width allows a few micrometers clearance for the corresponding width of the fibre. Assuming that the V groove depth in the substrate is the same as in the first embodiment, a superstrate groove depth of 42.5 μm gives a cell height h of 40 μm, with a groove width of typically 125 μm. Gold electrodes are deposited on the superstrate as described for the first embodiment, except that an external electrode cannot be applied in this case. The substrate, superstrate and optical fibres are then assembled and sealed using a standard UV curing epoxy glue 6, as in the first embodiment.

Figure 11:
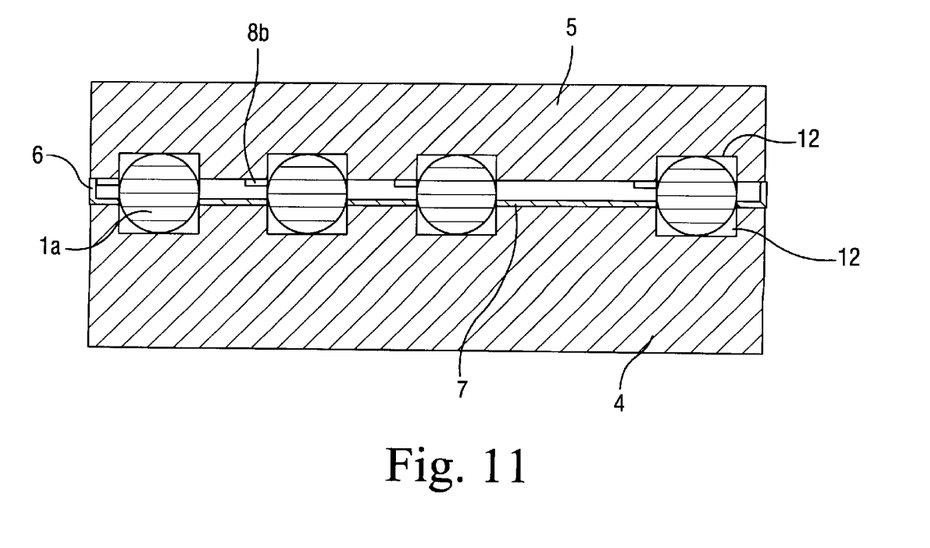
FIG. 11 is a schematic sectional view of a device in accordance with a third embodiment of the invention.

Referring to FIG. 11, in a third embodiment of the invention, the superstrate 5 is fabricated as for the second embodiment except that the groove depth is 50 μm, with a width of 125 μm. The substrate 4 is also fabricated with rectangular grooves with a width of 125 μm and a depth of 50 μm. This gives an overall cell height of 25 μm for a standard fibre. Precise location of the optical fibres is preferred, for which highly accurate lithographic fabrication methods, such as the LIGA process, are most suitable. The LIGA process, developed at the research centre Forschungszentrum Karlsruhe GmbH (FZK, formerly KfK) in Karlsrube, Germany, involves the use of an X-ray synchrotron to produce moulds for making micro-miniature structures to tolerances of less than 1 μm, ensuring minimal coupling losses between fibres due to offset of the fibre cores.

A titanium coated ceramic substrate is coated with a thick layer of photoresist, typically PMMA, up to a maximum depth of 1–2 mm. This is then exposed through a mask to high intensity X-rays from a synchrotron. As the X-rays have a characteristic wavelength of only 0.2 nm, diffraction effects are minimised and the resulting resist structure has substantially vertical walls. The resist is developed by standard techniques to open windows through to the substrate, which is electroplated with nickel to the required depth. After stripping all of the remaining resist, a metal microstructure remains which may be used directly or replicated to make moulds, to be applied to plastics such as polymethacrylates to form a substrate 4 with the appropriate rectangular groove pattern. The process is described in detail by M. McCormick, E. Chowanietz and A. Lees; "Microengineering design and manufacture using the LIGA process", IEE Engineering Science and Education Journal, December 1994, pp. 255–262.

A standard evaporation technique is used to apply a common electrode 7 to the inside surface of the substrate 4, with a patterned electrode on the superstrate being formed by a standard lighographic process or by evaporation through a metal foil shadow mask.

Figure 12:
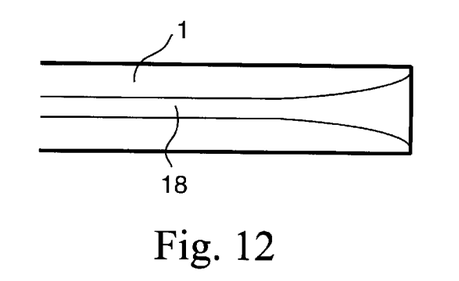
FIG. 12 is a schematic view of a tapered fibre.

The use of a standard fibre is not necessary in any of the previous embodiments. Fibres with smaller external diameters, but the same core diameter, may be used to reduce the required groove depths and may simplify etching and processing requirements. Referring to FIG. 12, fibres 1 are used in which the core 18 widens towards the output. Suitable fibres are made to order by Sumisen Corporation of Japan or according to the techniques described in our European Patent Application EP 96300394.2 filed on Jan. 18, 1996. Increasing the output core diameter from 9 μm to, for example, 25 μm, reduces the beam divergence in percentage terms for a given fibre-to-fibre spacing. The result is improved fibre-to-fibre coupling and a more parallel beam in the cavity and so higher cavity finesse. As for the first embodiment, the fibres may again be end-coated with a partially reflective coating or have Bragg gratings applied, for example by hydrogen doping and photobleaching. In this latter case, a grating with a uniform physical spatial period is chirped, in that the effective pitch of the grating becomes shorter towards the end of the fibre, due to a change in effective refractive index along the taper of the fibre core. This chirp is useful for increasing the width of the reflection profile of the fibre grating.

The operation of a type I device will now be described. When optical radiation of a particular polarization is directed into an optical fibre at one end of the device, the device in accordance with the invention operates as a resonant cavity. The optical radiation will only be transmitted through the liquid crystal filled cavity and out through the aligned optical fibre when the resonant condition is achieved. Resonance occurs at a particular wavelength, dependent on the refractive index of the liquid crystal. The resonant condition can be approximately characterised as follows:

$$n\lambda_r = 2\mu d$$

where $\lambda_r$ is the resonant wavelength $\mu$ is the refractive index of the cavity material at the resonant wavelength d is the length of the cavity n is a positive integer The refractive index of the liquid crystal material may be varied by applying an A.C. voltage between the relevant electrode on the superstrate, for example, 8a, and the common electrode 7 on the substrate. Typically, a low AC voltage greater than 0.9 volts (a typical theoretical threshold RMS voltage) and less than 5 volts, at a typical frequency of 1 kHz, is applied. A 1 kHz drive signal above the threshold RMS voltage $V_o$ will induce a distortion known as the "Freedericksz distortion" in an initially planar aligned slab of the material. Removal of the drive signal will allow the system to relax back to the initial uniaxial state, with a relaxation time depending on the material's viscosity and elastic constant coefficients and the slab thickness. The device therefore operates as an optical filter which provides a refractive index change $\Delta n$ of typically 0.2 for a component of the input polarisation, tunable over a wavelength range of typically 200 nm where broad band reflectors are used.

Figure 13:
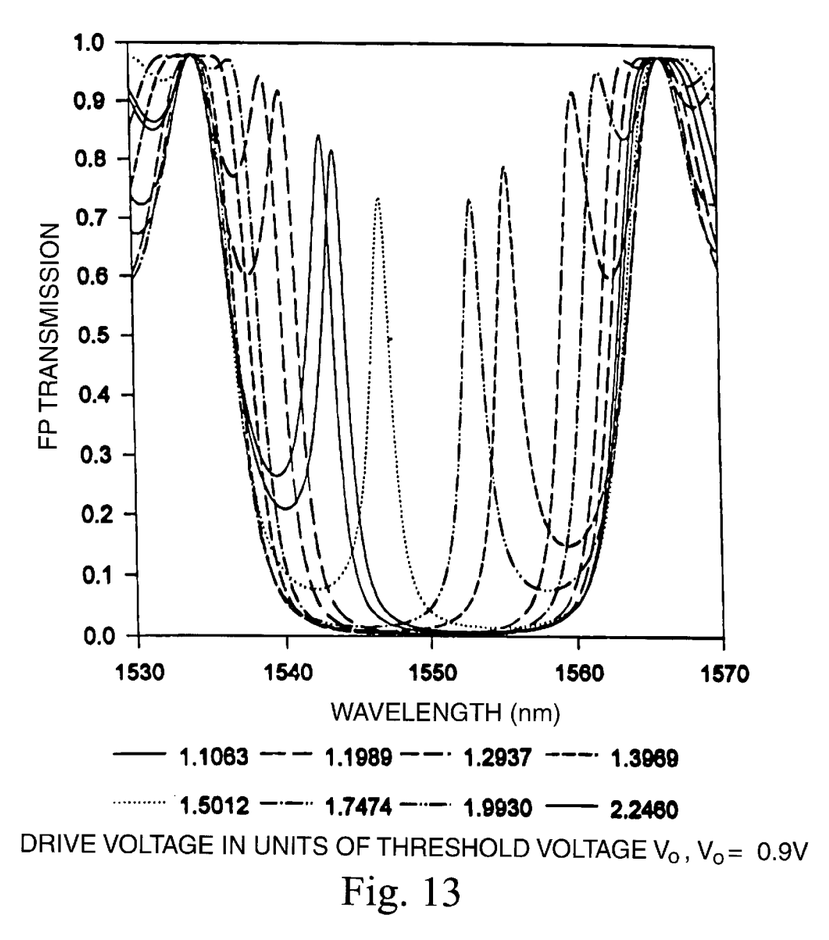
FIG. 13 is a graph showing the typical wavelength response with applied voltage of a device with Bragg grating reflectors.

A typical theoretical response for a type I device is shown in FIG. 13 where narrow band fibre grating reflectors, corresponding to the gratings 11 in FIG. 2, form a cavity which is filled with a liquid crystal material. The tuning range in this case is limited by the bandwidth of the grating reflectors (around +/−10 nm on the centre wavelength of 1550 nm). Multilayer dielectric coatings can have much broader profiles and tuning can cover much wider ranges.

To fully model the electric field induced response of the average birefringence of the liquid crystal filled cavity requires a finite element analysis for the spatial distribution of the nematic liquid crystal director with boundary conditions not only for the silicon substrates but also the V-groove ends and optical fibre faces. References is directed to M. Kitamura, "Computer simulation of director profile in two dimensional electric field", SID Proc. 1994 International Workshop on Active Matrix LCDs, 350–353 (1994), and J. B. Davies, S. E. Day, F. DiPasquale and F. A. Fernandez, "Finite element modelling in 2-D of nematic liquid crystal stuctures", Electronics Letters, 32(6), 582–583 (1996). However, some insight can be obtained by making the simplifying assumption that the silicon surfaces exert the most significant influence on the liquid crystal alignment, allowing simple analytical models such as that described by Welford and Sambles for an infinitely extended nematic liquid crystal layer to be applied. Reference is further directed to K. R. Welford, J. Sambles, Mol. Cryst. Liq. Cryst., 147, 25–42 (1987), "Analysis of electric field induced deformations in a nematic liquid crystal for any applied field."

Figure 14:
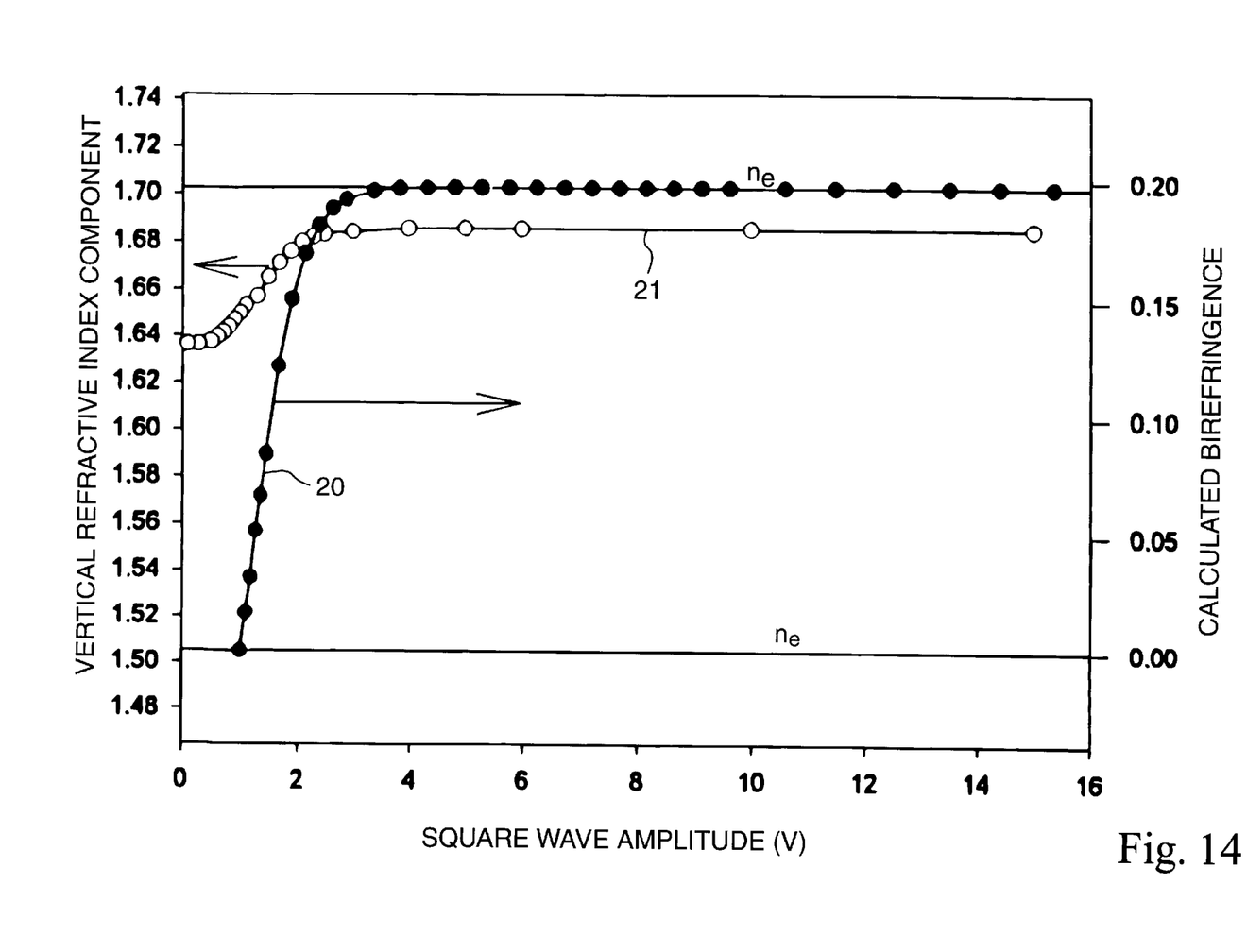
FIG. 14 is a graph showing the variation in theoretical and measured birefringence with applied voltage in a type I device.

Referring to FIG. 14, application of the Welford and Sambles model with appropriate modifications for the telecommunications frequencies of interest, and with liquid crystal parameters taken from, for example S. D. Jacobs, Chapter 2.5, "Liquid crystals for laser applications" in Handbook of laser science and technology, Vol. IV, "Optical Materials (Pt. 2)", Ed. M. J. Weber, CRC Press Inc. Boca Raton, Fla., USA, (1986), leads to the curve 20 (filled points) showing the theoretical variation of birefringence vs. drive signal amplitude V, of a type I device filled with the nematic liquid crystal mixture E7, with a calculated theoretical threshold voltage $V_o=0.963V$.

Figure 15:
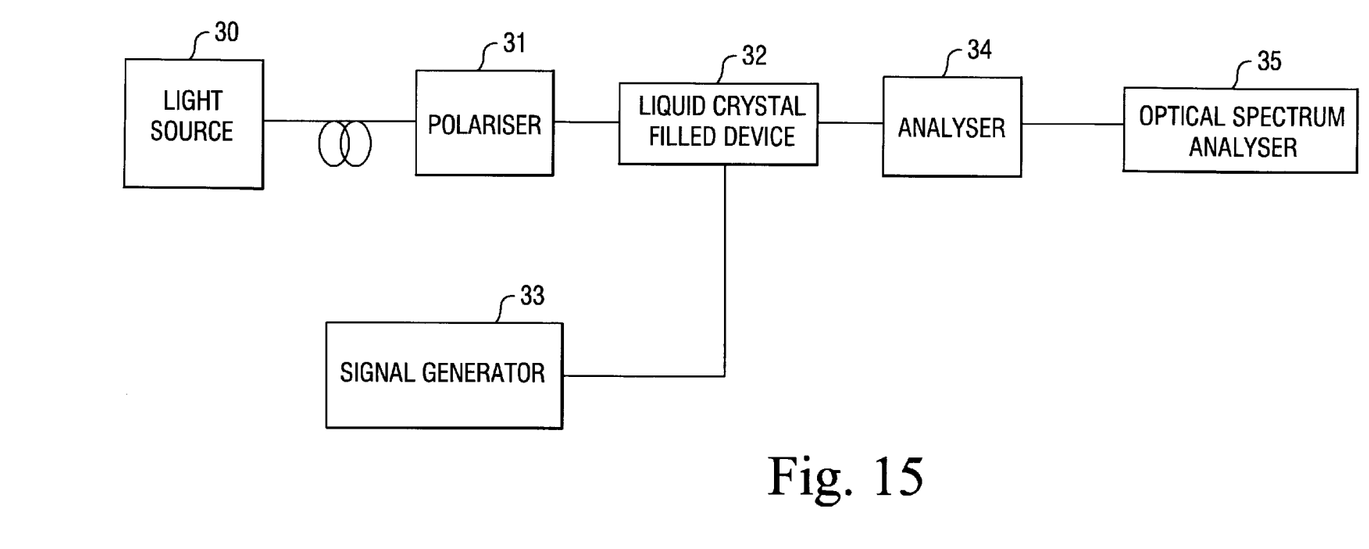
FIG. 15 shows apparatus suitable for measurement of the vertical component of refractive index change with applied voltage in a type I device.

The actual transmission spectra of the filled device can be measured using the arrangement shown in FIG. 15. Light from light source 30 is passed through a polariser 31 and then to the liquid crystal filled device 32, which is fed with a 1 kHz square wave drive signal from a signal generator 33. The output from the device 32 is passed through an analyser (polariser) 34 and then to an optical spectrum analyser 35.

The resulting measured data for a type I device are shown as curve 21 (unfilled points) in FIG. 14. The measured data shows the almost complete absence of a threshold voltage $V_o$, down to a lowest applied voltage of 200 mV, whilst the voltage at which the curve saturates is only slightly lower than that predicted by the model (about 3 times the theoretical threshold voltage $V_o$). However, the birefringence range is only 25% of that predicted for an idealised alignment geometry. Although the reason for the absence of the voltage threshold is not fully understood, it is probably due to liquid crystal alignment effects near the end regions of the cavity close to the fibre reflectors. While it is difficult to control the alignment effects systematically with the above described use of a sawing technique to dress the sides of the silicon pedestal between the fibres, the use of techniques such as deep reactive ion etching to remove the sloping V-groove ends may address this problem.

As a further variation, the nematic liquid crystal material is replaced by a dual frequency liquid crystal mixture, such as ZLI-2461 manufactured by E. Merck, Narmstadt, Germany. With a 1 kHz drive signal, the material behaves in a similar way to simple nematic liquid crystal material. However, faster "turn-off" times can be achieved by driving the material at a higher frequency, typically greater than 10 kHz, at which the dielectric anisotropy changes sign to negative, thus reversing the field induced torque on the liquid crystal molecules. The turn-off time now includes terms dependant on the high frequency RMS voltage and is generally somewhat smaller than the comparable value for simple field-free relaxation.

The construction of a type II device is the same as that of the type I device as described above, except that the alignment layer is applied so that the liquid crystal director is aligned in a direction normal to the longitudinal axis of the optical input and output fibres, as shown in FIG. 8b. The type II device is of particular interest for polarisation state controller applications, in which case the fibre end faces are not coated with dielectric reflectors.

Referring again to FIG. 9, for a type II device without fibre coatings, the diverging cavity mode will sample the liquid crystal alignment in and around the shaded region 40 shown. The fibre would see the full liquid crystal birefringence, $n_e$-$n_o$, amounting to about 0.198 at a wavelength of 1.55 μm. The average sampled birefringence should not change to any great degree with drive voltage because the curvature of the director tangents within the shaded region 40 does not alter significantly and they remain almost linear throughout.

However, as the orientation of the liquid crystal molecules changes with applied voltage, the azimuthal angle φ seen by the fibre 1 in the type II device also changes. The azimuthal angle φ is the angle that the fast axis of the liquid crystal material makes relative to an axis which is horizontal and normal to the fibre axis, as seen in FIG. 9. In the ideal model, this change in azimuthal angle is between 0 and 90°, making the type II device suitable for use as an electrically controllable waveplate. By contrast, the azimuthal angle seen by the fibre 1 in the type I orientation is always 90°.

Figure 16:
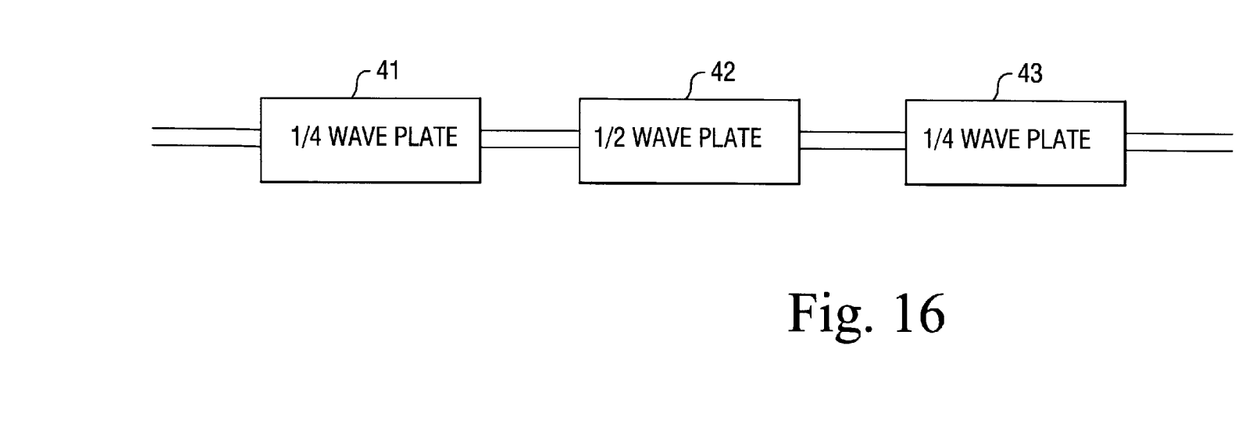
FIG. 16 illustrates the cascading of type II devices to produce a polarisation state controller.

Referring to FIG. 16, several type II devices cascaded in series could be used to form an electrically controlled fibre polarisation state controller, in particular by adjusting the lengths of each device so as to produce a cascade arrangement including an n+¼ wave waveplate 41, n+½ wave waveplate 42, n+¼ wave waveplate 43, where n is an integer, the operation of which is explained in relation to the following further example.

Figure 17:
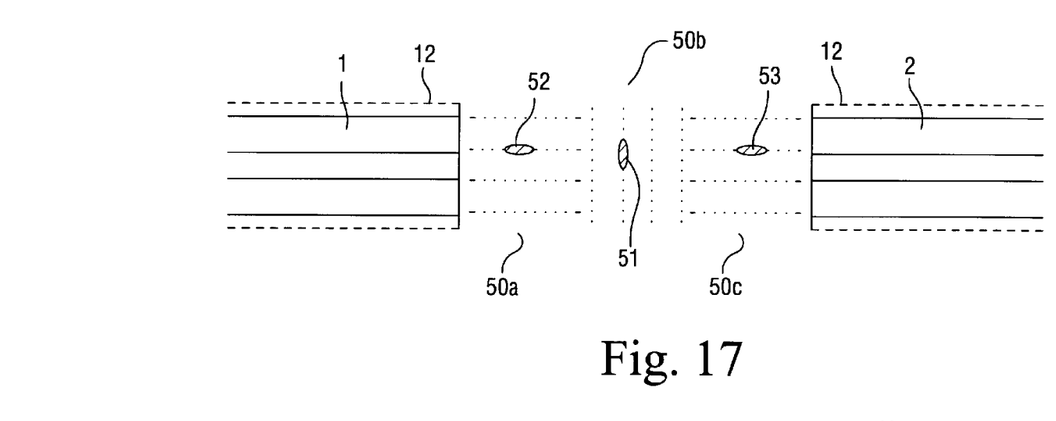
FIG. 17 is a schematic view of a further example of the invention in which the cavity comprises three sections of liquid crystal material at different orientations.

Referring to FIG. 17, in a further example of the device, an alignment grating 50 is written onto the substrate and superstrate in three sections, 50a, b and c, where the middle section 50b of the grating is perpendicular to the grating sections at either side. The grating is located in the space between fibres 1, 2 held in grooves 12. When the device is filled with liquid crystal material, the liquid crystal molecules 51 in the middle section 50b are aligned essentially perpendicular to the molecules 52, 53 on either side. The electrodes (not shown) are segmented to individually address each of these differently oriented regions to permit the development of polarisation insensitive tuning devices and polarisation controllers.

The alignment grating is formed by etching a surface relief grating 50 into the silicon. Typically, an etch depth of 20–50 nm is sufficient. The pitch of the grating is chosen as a compromise between ease of fabrication, for example standard photolithography requires features in excess of 1 μm, and having resonably uniform alignment and a large number of grating periods across each alignment section, typically 5 to 10 periods, thus fixing the maximum acceptable grating pitch. The grating permits variation of the liquid crystal alignment direction within the slab of liquid crystal material.

The width of the central section 50b is designed so that at about the wavelength of operation, this section is half wave plate, with d=nλ/2, where n is an odd integer greater than 1, to provide a sufficiently large width for ease of fabrication. Since the width d remains constant over the entire tuning range, d is chosen to achieve a best match at the central wavelength. For a central wavelength of 1550 nm, assuming n=5, d=3.9 μm. the net effect is that for a resonably high finesse cavity, the polarisaion will be scrambled and the polarisation sensitivity minimised at the expense of a reduced tuning range. However, liquid crystal alignment defects at the fibre interfaces and at the transitions from one segment to another cause some degradation of the cavity finesse.

An $SiO_x$ or similar alignment layer could also be selectively deposited in sections instead of the grating.

Figure 18:
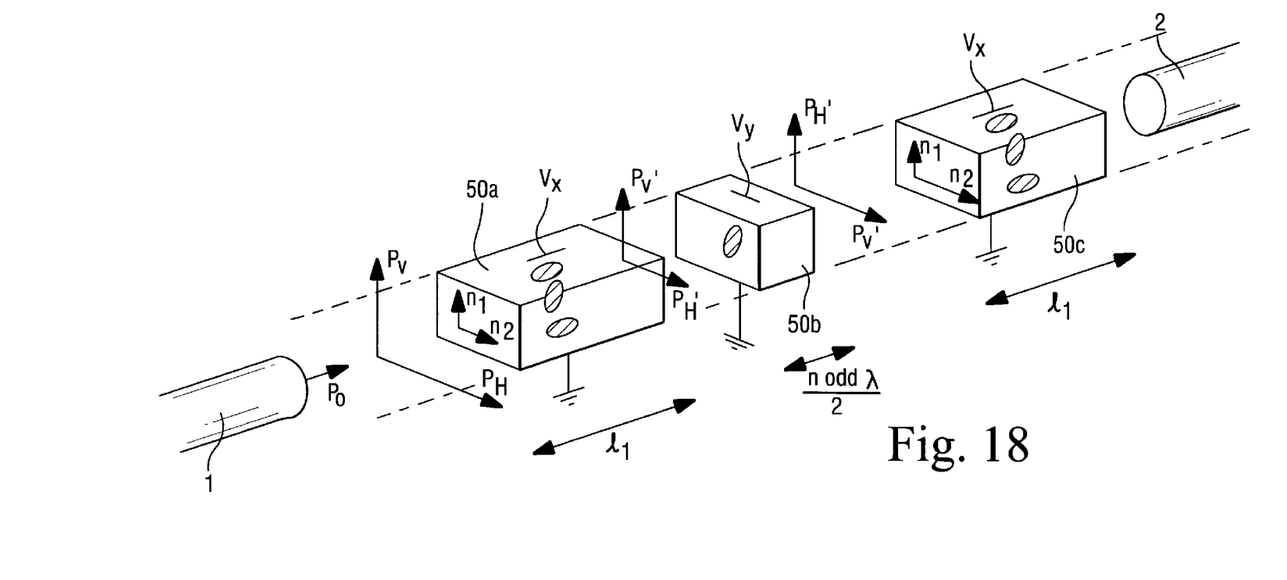
FIG. 18 is a schematic diagram of components of the polarisation states for the example shown in FIG. 17.

The principle of operation of this example is described by reference to FIG. 18. An input polarisation $P_o$ of light emerging from the fibre 1 can be resolved into vertical and horizontal components $P_V$ and $P_H$. On passing through the first segment 50a of the cavity, $P_V$ encounters a refractive index $n_1$ and $P_H$ encounters a refractive index $n_2$. At the exit of this segment, the resolved field vectors will be $P_V{'}$ and $P_H{'}$. These can be interchanged by passing through a second segment 50b corresponding to a half wave plate with the fast axis (a property related to the orientation of the liquid crystal molecules) at 45° to the vertical and horizontal directions. For the passage through the final segment 50c of the cell, $P_H{'}$ now encounters index $n_1$ and $P_V{'}$ now encounters index $n_2$, if the first and final segments are identical and identically driven. Each polarisation component will encounter a cavity optical length $1_1(n_1+n_2)$ compared with $2\ 1_1 n_1$ and $2\ 1_1 n_2$ if the half wave section were absent. It is this symmetry that makes the device polarisation insensitive.

The polarisation exchange will occur on each pass through the cell. For a finesse, F, this can be envisaged as happening an average F times. If d is not an exact half-wave plate distance for the etalon wavelength then each time a linearly polarised component passes through the central segment it will be rotated and made slightly elliptical. A large number of passes will cause significant elliptical polarisation. There is some scope for adjusting the properties of the half wave plate by varying the voltage $V_y$.

What is claimed is:

1. A tunable optical device comprising:
   a substrate and a superstrate;
   first and second optical waveguides sandwiched between said substrate and said superstrate so as to define a space between said waveguides;
   an optical resonant cavity extending across said space, said space containing a liquid crystal material to permit tuning of the cavity; and
   alignment means to orientate the liquid crystal material so that it responds to an applied electric field, wherein the alignment means is disposed on at least one of the substrate and the superstrate.

2. A device according to claim 1 wherein the optical waveguides comprise elongate optical fibres.

3. A device according to claim 2 wherein said optical resonant cavity includes a semi-reflective coating on the end of at least one of the optical fibres.

4. A device according to claim 2 wherein said optical resonant cavity includes a Bragg grating in at least one of the optical fibres.

5. A device according to claim 2 wherein said alignment means are arranged such that the orientation of the liquid crystal material is generally parallel to the length of said optical fibres.

6. A device according to claim 2 wherein said alignment means are arranged such that the orientation of the liquid crystal material is transverse to the length of said optical fibres.

7. A device according to claim 2 wherein the optical fibres are held in grooves formed in the surface of the substrate and superstrate.

8. A device according to claim 7 wherein the grooves in the substrate are V grooves.

9. A device according to claim 1 wherein said alignment means are arranged such that the orientation of the liquid crystal material varies along the length of the space between said waveguides.

10. A device according to claim 1 wherein said alignment means comprise an alignment layer formed on at least one of the substrate and the superstrate.

11. A device according to claim 10 wherein said alignment layer comprises a coating of non-stoichiometric silicon oxide.

12. A device according to claim 1 wherein said alignment means comprise a surface grating formed on at least one of the substrate and the superstrate.

13. A device according to claim 1 including at least one electrode for applying a voltage to vary the refractive index of the liquid crystal material, said at least one electrode being disposed between the substrate and the liquid crystal material or between the superstrate and the liquid crystal material.

14. A device according to claim 1 wherein the substrate is formed of silicon.

15. A device according to claim 1 wherein a threshold voltage $V_o$ of the device is less than 0.2 V.

16. A tunable optical device comprising:

a housing;

first and second optical waveguides extending into the housing so as to define a space between said waveguides, said space defining an optical path between the waveguides;

an optical resonant cavity extending across said space, said space containing a liquid crystal material to permit tuning of the cavity; and alignment structure to orientate the liquid crystal material so that it responds to an applied electric field, wherein the alignment structure is disposed outside the optical path on at least one structure defining said space.

17. A device according to claim 16 wherein said alignment structure comprise an alignment layer formed on an inner surface of the housing.

18. A device according to claim 16 wherein said alignment structure comprise a surface grating formed on an inner surface of the housing.

19. A tunable optical device comprising:

a substrate and a superstrate;

first and second elongate optical fibres sandwiched between said substrate and said superstrate so as to define a space between said fibres, said space containing a liquid crystal material having an optical fast axis; and alignment means to orientate the liquid crystal material so that it responds to an applied electric field, wherein the alignment means are disposed on at least one of said substrate and said superstrate orientate the liquid crystal material in a direction transverse to the length of said fibres, whereby to permit rotation of said fast axis of said liquid crystal material.

20. A device according to claim 19 including at least one electrode for applying a voltage to rotate the fast axis to the liquid crystal material.

21. A device according to claim 20 wherein said at least one electrode is positioned on at least one of the substrate and the superstrate.

22. A polarisation state controller comprising a plurality of cascaded tunable optical devices according to claim 19.

23. A polarisation state controller according to claim 22 wherein said plurality of cascaded tunable optical devices are configured to provide a selectively tunable arrangement comprising successive quarter waveplate, half waveplate and quarter waveplate devices.

24. A polarisation sate controller comprising a plurality of cascaded tunable optical devices as in claim 19.

25. A polarisation state controller as in claim 24 wherein said cascade of tunable optical devices include a selectively tunable quarter waveplate, half waveplate and quarter waveplate devices.

26. A polarisation insensitive tunable optical device comprising:

a substrate and a superstrate;

first and second optical fibres sandwiched between said substrate and said superstrate so as to define a space between said fibres;

an optical resonant cavity extending across said space, said space containing a liquid crystal material to permit tuning of the cavity; and an alignment layer disposed on at least one of said substrate and said superstrate to orientate the liquid crystal material so that it responds to an applied electric field, wherein the alignment layer is disposed on at least one of the substrate and the superstrate, said alignment layer comprising first and second parts which orientate the liquid crystal material in a direction generally parallel to the length of the fibres and a third part, between said first and second parts, which orientates the liquid crystal material in a direction transverse to the length of the fibres.

27. A device according to claim 26 wherein said alignment layer comprises a surface grating formed on the substrate and the superstrate.

28. An array of individually tunable optical filters, including a substrate and a superstrate, wherein each filter comprises:

first and second opposed optical fibres located between the substrate and the superstrate and aligned by grooves in the substrate and the superstrate;

a liquid crystal filled space between the ends of the first and second fibres;

an optical resonant cavity extending across the space; and an electrode formed on at least one of the substrate and the superstrate to permit individual tuning of the cavity, wherein an alignment layer is disposed on at least one of said substrate and said superstrate.

29. A tunable optical device comprising:

a substrate and a superstrate;

first and second elongate optical fibres sandwiched between said substrate and said superstrate so as to define a space between said waveguides;

an optical resonant frequency cavity extending across said space, said space containing a liquid crystal material to permit tuning of the frequency of said cavity; and alignment means to orientate the liquid crystal material so that it responds to an applied electric field, wherein the alignment means is disposed on at least one of the substrate and the superstrate.

30. A device as in claim 29 wherein said optical waveguides comprise elongate optical fibres and said alignment means are arranged such that the orientation of the liquid crystal material is generally parallel to the length of said optical fibres.

31. A device as in claim 29 wherein said optical waveguides comprise elongate optical fibres and said alignment means are arranged such that the orientation of the liquid crystal material is transverse to the length of said optical fibres.

32. A device as in claim 29 wherein said alignment means are arranged such that the orientation of the liquid crystal material varies along the length of the space between said waveguides.

33. A device as in claim 29 wherein said alignment means comprise an alignment layer formed on at least one of the substrate and the superstrate.

34. A device as in claim 33 wherein said alignment layer comprises a coating of non-stoichiometric silicon oxide.

35. A device as in claim 29 wherein said alignment means comprise a surface grating formed on at least one of the substrate and the superstrate.

36. A device as in claim 29 wherein said optical waveguides comprise elongate optical fibres and said optical fibres are held in grooves formed in the surface of the substrate and superstrate.

37. A device as in claim 36 wherein the grooves in the substrate are V grooves.

38. A device as in claim 29 including:
at least on electrode for applying a voltage to vary the refractive index of the liquid crystal material,
said at least one electrode being disposed between the substrate and the liquid crystal material or between the superstrate and the liquid crystal material.

39. A device as in claim 29 wherein the substrate is formed of silicon.

40. A device as in claim 29 wherein a threshold voltage $V_o$ of the device is less than 0.2V.

41. A frequency-tunable optical device comprising:
a housing;
a first and second optical waveguides extending into the housing so as to define a space between said waveguides, said space defining an optical path between the waveguides;
an optical resonant-frequency cavity extending across said space, said space containing a liquid crystal material to permit tuning the frequency of the cavity; and
alignment structure to orientate the liquid crystal material so that it responds to an applied electric field,
wherein the alignment structure is disposed outside the optical path on at least one structure defining said space.

42. A device as in claim 41 wherein said alignment structure comprise an alignment layer formed on an inner surface of the housing.

43. A device as in claim 41 wherein said alignment structure comprise a surface grating formed on an inner surface of the housing.

44. A frequency-tunable optical device comprising:
a substrate and a superstrate;
first and second elongate optical fibres sandwiched between said substrate and said superstrate so as to define a space between said fibres,
said space containing a liquid crystal material having an optical fast axis, the orientation of said fast axis at least in part determining a frequency-dependent response of the device; and
alignment means disposed on at least one of said substrate and said superstrate to orientate the liquid crystal material so that it responds to an applied electric field,
wherein the alignment means are arranged to orientate the liquid crystal material in a direction transverse to the length of said fibres,
whereby to permit rotation of said fast axis of said liquid crystal material.

45. A device as in claim 44 including at least one electrode for applying a voltage to rotate the fast axis of the liquid crystal material.

46. A device as in claim 45 wherein said at least one electrode is positioned on at least one of the substrate and the superstrate.

47. An array of individually frequency-tunable optical filters disposed between:
a substrate and a superstrate, wherein each filter comprises:
first and second opposed optical fibres located between the substrate and the superstrate and aligned by grooves in the substrate and the superstrate;
a liquid crystal filled space between the ends of the first and second fibres;
an optical resonant frequency cavity extending across the space; and
an electrode formed on at least on of the substrate and the superstrate to permit individual tuning of the frequency of the cavity, wherein an alignment layer is disposed on at least one of said substrate and said superstrate.

* * * * *